Jan. 6, 1970   C. F. SONNENBERG ET AL   3,488,591
VOLTAGE AND CURRENT RESPONSIVE APPARATUS EMPLOYING MOLECULAR
FUNCTION BLOCK SENSORS SENSITIVE TO ELECTRIC
AND MAGNETIC FIELDS FOR USE IN
A HIGH VOLTAGE BUSHING
Filed March 11, 1965                2 Sheets-Sheet 1

WITNESSES
Theodore F. Wrobel
James F. Young

INVENTORS
Charles F. Sonnenberg
and William M. Kreh
BY
ATTORNEY

United States Patent Office 3,488,591
Patented Jan. 6, 1970

3,488,591
VOLTAGE AND CURRENT RESPONSIVE APPARATUS EMPLOYING MOLECULAR FUNCTION BLOCK SENSORS SENSITIVE TO ELECTRIC AND MAGNETIC FIELDS FOR USE IN A HIGH VOLTAGE BUSHING
Charles F. Sonnenberg, Penn Hills, Pittsburgh, and William M. Kreh, Elizabeth Township, McKeesport, Pa., assignors to Westinghouse Electric Corporation, Pittsburgh, Pa., a corporation of Pennsylvania
Filed Mar. 11, 1965, Ser. No. 438,926
Int. Cl. G01r 33/02
U.S. Cl. 324—117
7 Claims

ABSTRACT OF THE DISCLOSURE

A bushing which may support a high voltage line at one end thereof and be mounted at the other end thereof on conductive means at ground potential or at opposite polarity with respect to the line, or which may have a conductor stud passing therethrough and a ground sleeve and flange mounted around the outside of the bushing at a selected axial position, has one or more molecular blocks embedded in the insulating portion of the bushing at predetermined positions therein, each of the molecular blocks including a portion for utilizing energy in the bushing to obtain a biasing voltage and a sensor portion having the biasing voltage applied thereto for generating a signal which is a function of the strength of either the magnetic field or the electric field. Where alternating current is applied across the bushing, the energy used in generating the biasing voltage may be obtained from the alternating current magnetic field or from heat generated in the dielectric resulting from dielectric losses, eddy currents, or leakage current through the dielectric between two conductive surfaces. The biasing signal is utilized by the sensor portion which is responsive to variations in the magnetic or electric field.

---

This invention relates to improvements in voltage and current responsive apparatus, and more particularly to voltage and current responsive apparatus especially suitable for use with a high voltage bushing for a high voltage conductor, and employing molecular function block sensors for obtaining signals proportional to the voltage and current in the high voltage conductor.

In the present state of the art, the measurement of current in power systems is usually accomplished by the use of current transformers, and the measurement of potential by dividing networks such for example as a network employing coupling capacitors, or potential taps on a condenser bushing. One prior art device emlpoys a transistorized amplifier used in conjunction with a condenserless bushing as a means for obtaining a signal which may be used as a measure of current or voltage.

Generally speaking, prior art devices are complicated and expensive since there is usually the need for insulating the device sufficiently to withstand the normal conductor-to-ground voltage, and also peak transient voltages which might be developed.

The apparatus of the instant invention overcomes these and other disadvantages of the prior art by employing molecular block signal generators located in or adjacent a bushing, the mounting for which may in some applications be at ground potental but which, for certain embodiments of the invention, must include an element at ground potential or of opposite polarity so that an electric or dielectric field is set up. Where a current-carrying conductor passes through the bushing, a molecular signal generator may produce a signal which is proportional to the strength of the magnetic field, that is, the number of lines of magnetic flux, and which accordingly is a function of the value of the current. A molecular signal generator may also produce a signal which is a function of the strength of the electric or dielectric field, and accordingly one which is a function of the voltage across all or a predetermined part of the bushing. The signals are amplified, if desired in the molecular devices themselves, or in any other convenient manner, and utilized to control relays, or used in any other desired manner, such for example as to give an indication of the value of the current and/or voltage, or to operate a circuit breaker.

Accordingly, a primary object of the invention is to provide new and improved current measuring apparatus especially suitable for use with a high voltage bushing.

Another object is to provide new and improved voltage measuring apparatus especially suitable for use with a high voltage bushing.

A further object is to provide a new and improved bushing having therein high tension conductor monitoring apparatus which may operate at substantially ground potential.

An additional object is to provide new and improved high tension conductor monitoring apparatus employing semiconductor molecular signal generating deivces responsive to the magnetic flux and/or electric field flux adjacent the conductor.

These and other objects will become more clearly apparent after a study of the following specification when read in connection with the accompanying drawings, in which.

Figure 1:
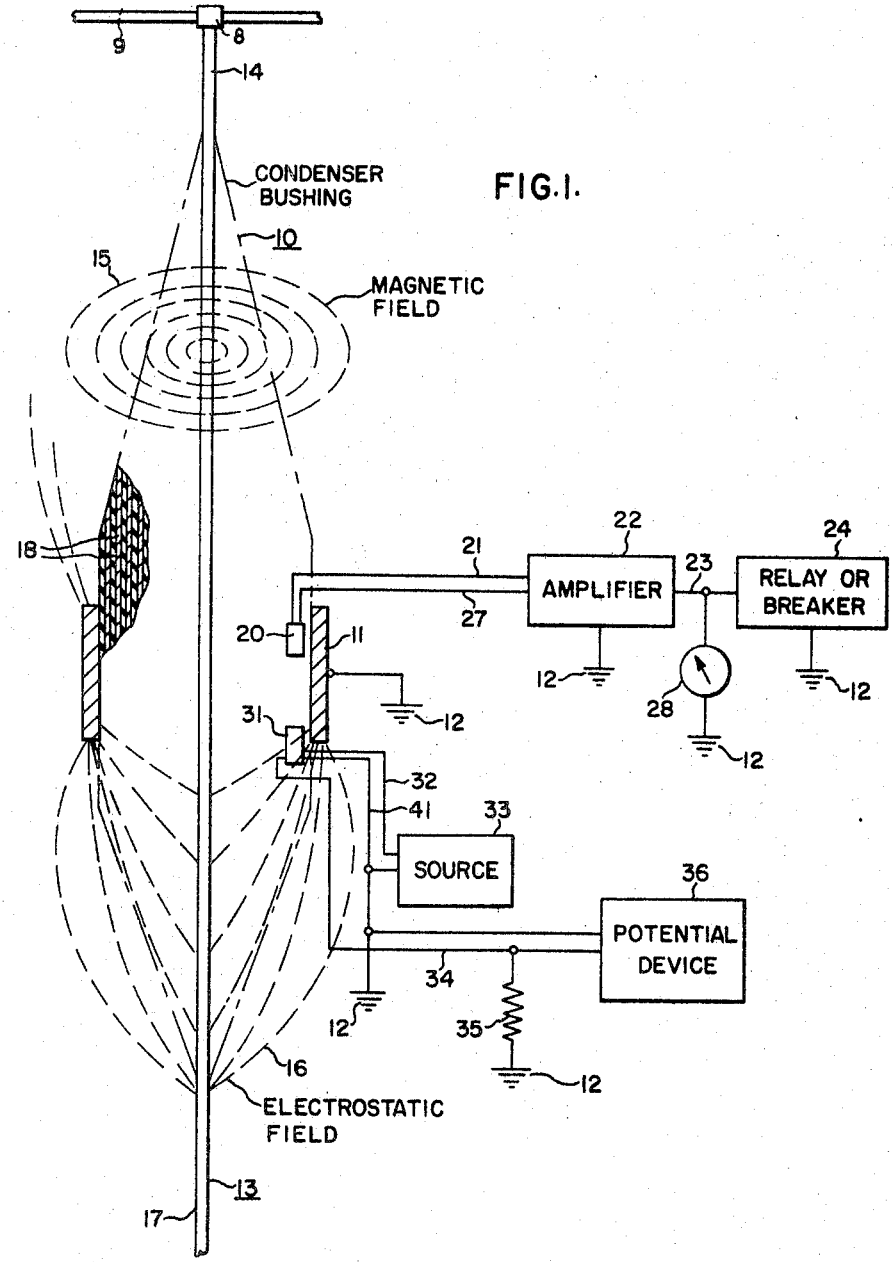
FIG. 1 is an electrical circuit diagram partially schematic and partially diagrammatic of apparatus embodying the invention.

Referring now to the drawings for a more detailed understanding of the invention, and in particular to FIG. 1 thereof, there is shown generally designated 10 a condenser bushing, which it will be understood has one or more substantially cylindrical electrically isolated layers of conductive material 18 therein substantially coaxial with a conductor stud 13 passing therethrough, to provide more uniform distribution of the electric field and reduce or eliminate large field gradients. Whereas a condenser bushing is chosen to illustrate the embodiment of FIG. 1, it will be understood that the invention is not limited thereto. In accordance with usual practice, the condenser bushing 10 has a terminal or mounting flange 11 which is connected to ground 12, althought the flange could be any member of opposite polarity. The material of the layers within the bushing is selected so as not to interfere with the passage of magnetic lines of force, numerous materials being suitable for this purpose, including copper and aluminum foil for example. As previously stated, the high voltage conductor or stud is shown at 13, and magnetic and electrostatic fields are shown at 15 and 16 respectively. The stud 13 has upper end 14 connected by a suitable connector 8 to a high voltage line 9, and has lower end 17 connected to another line or to any convenient electrical equipment. In FIG. 1, it is assumed that a current flows through conductor stud 13 so that both magnetic and electric fields are set up in the bushing and used in generating separate signals; it will be understood though, that bushing apparatus having only an electric field therein may be employed.

Mounted in the bushing 10 near the ground flange 11 is a small molecular block 20 operatively connected by leads 21 and 27 to supply an output to amplifier 22, which may be of any conventional type, the amplifier 22 supplying its output by lead means 23 to a relay or other control device shown in block form at 24. A meter 28 may also be connected between lead 23 and ground 12. Sensing device 20 is responsive to changes in the strength of the magnetic field of the current carrying stud, which field varies with variations in the current in the stud; meter 28 may be calibrated in current values of the current in stud 13. The molecular device 20 may be, if desired, a Hall generator having a direct current potential applied thereto from a source, not shown for convenience of illustration. One skilled in the art will know that at substations where circuit breakers are located, it is the usual practice to have a source of direct current potential for operating the breakers. In other embodiments of the invention, the molecular block sensor may include its own means for generating a direct current potential. The operation of the Hall generator to generate a signal in response to magnetic lines of flux impinging thereon or passing there through when a direct current potential is applied thereto in a predetermined fashion is well known and need not be described in detail.

Preferably lead 21 is grounded, so that sensor 20 will be at substantially ground potential.

Assume by way of description that the sensor device 20 is a rectangular shaped member or slab of semiconductor material, that the direct current potential is applied between the ends of the rectangular slab, that the signal leads are connected to the sides of the rectangular slab, then when an electromagnetic field having lines of force substantially vertical to a predetermined one of these dimensions or directions passes through the sensor device, a signal is generated, the amplitude of the signal being a function of the current, and also a function of the strength of the magnetic field passing therethrough. The output signal, as developed between aforementioned leads 21 and 27, in addition to operating the relay 24, may be used for other control and indication functions, such for example as to be applied to an aforementioned indicating device 28, the scale of which may be directly calibrated in current values in the conductor or stud 13 in a manner which will be readily understood by those skilled in the art.

Relay 24 may be set to operate only when a fault current of at least a predetermined value flows through stud 13.

At 31 there is shown a sensor device located in the electric field 16 and responsive to variations in the strength of the field impinging thereon. If desired, the sensor device 31 may be energized by leads 32 and 41 from a source of energizing potential 33. The output of the sensor device 31 is taken by lead 34 and applied across a resistor 35 having a high resistance value, and thence, after amplification, if desired, by an amplifier, not shown for convenience of illustration, used by a potential device or the equivalent, the device being of any convenient type and shown in block form at 36.

The portion of the device 31 which is sensitive to the electric field may include semiconductor material such as that employed in surface field effect devices, well known in the semiconductor art. If desired the electric field, which in an alternating current conductor varies periodically in amplitude, may modulate a bias current flowing through an element or portion of the sensor device 31 from source 33. The output is developed across resistor 35, between lead 34 and ground 12. The theory of operation of a semiconductor device in which the current flowing therein is modulated by a field applied to the device is well known, and may be found in numerous works dealing with this art. For example it is well known that the resistivity of a strip of semi-conductive material will vary with the strength of a field applied thereto from oppositely biased boundaries.

For a fuller understanding of field sensitive and other semiconductor materials, reference may be had to a work by Hunter entitled "Handbook of Semiconductor Electronics," 2nd ed., McGraw-Hill, 1962.

Reference may also be had to a work by Katz entitled "Solid State Magnetic and Dielectric Devices," John Wiley & Sons, 1959.

Another suitable material for use in device 31 and/or 20 may be material having ferromagnetic domains, in which the orientation of the molecules of the domains depends upon the strength of the field, and the conductivity through the device varies in accordance with domain orientation. Some discussion of ferromagnetic domains appears in an article by Philip R. Hershberg, entitled "Ferromagnetic Domains," appearing in Eelectro-Technology, January 1962, pages 71–82 inc.

It will be understood that in accordance with the teachings of an article entitled "The Concepts and Capabilities of Molecular Electronics" by Dr. S. W. Herwald, appearing in the Westinghouse Engineer, May 1960, pages 66–70 inc., the molecular sensor function blocks 20 and 31 may comprise regions which are devoted to signal amplification, so that external amplifiers such as amplifier 22 are not required. It will be further understood that in accordance with semiconductor function block technology, devices 20 and 31 may contain impurities, or be "doped," to provide conductors or a conductive portion in which, if the current in conductor stud 13 is an alternating current, the magnetic field periodically varying in intensity induces a voltage in the conductor region of the block, the voltages being rectified by a suitable semiconductive region of the block in accordance with well known semiconductor rectifier principles, and stored in a capacitor region of the semiconductor block in accordance with well known semiconductor principles, to provide a rectified and at least partially filtered direct current potential, certain portions of the block acting as a resistor in accordance with the type and concentration of impurities therein, so that a direct current source of potential is generated within the sensor block itself, and external source 33 may be dispensed with.

Thermoelectric domains for obtaining a direct current biasing signal may also be employed, in accordance with the aforementioned article by Dr. S. W. Herwald.

Figure 3A:
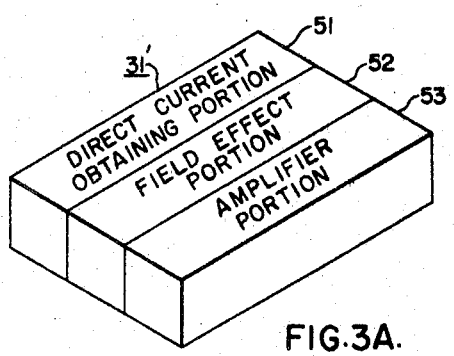
FIGS. 3A and 3B are views of suitable molecular sensor devices for obtaining signals proportional to the electric and magnetic fields.

Particular reference is made now to FIG. 3A. The molecular block sensor device 31' has a direct current voltage obtaining portion 51, a field effect portion 52 which may include a portion the conductivity of which varies with variations in the strength of the electric field impinging thereon, and a signal amplifying portion 53.

Figure 3B:
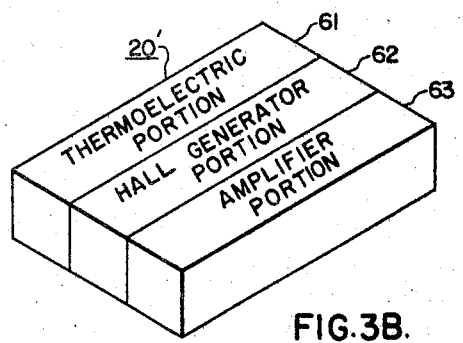

In FIG. 3B, the molecular sensing device generally designated 20' includes a thermoelectric potential generating portion 61, a Hall generator portion 62, and a signal amplifier portion 63.

Some temperature rise, suitable for thermoeleceric current generation, may be inherent in a high current bushing, or means may be included in a small portion of the bushing, such as eddy current forming means, to purposefully generate some heat, if needed. As will be readily understood by those skilled in the art, if the mounting flange 11 is composed of iron or other ferromagnetic material, it is likely to heat in large current bushings and a thermoelectric generating molecular block can be placed in the bushing near the flange to make use of the heat generated in the flange.

Figure 2:
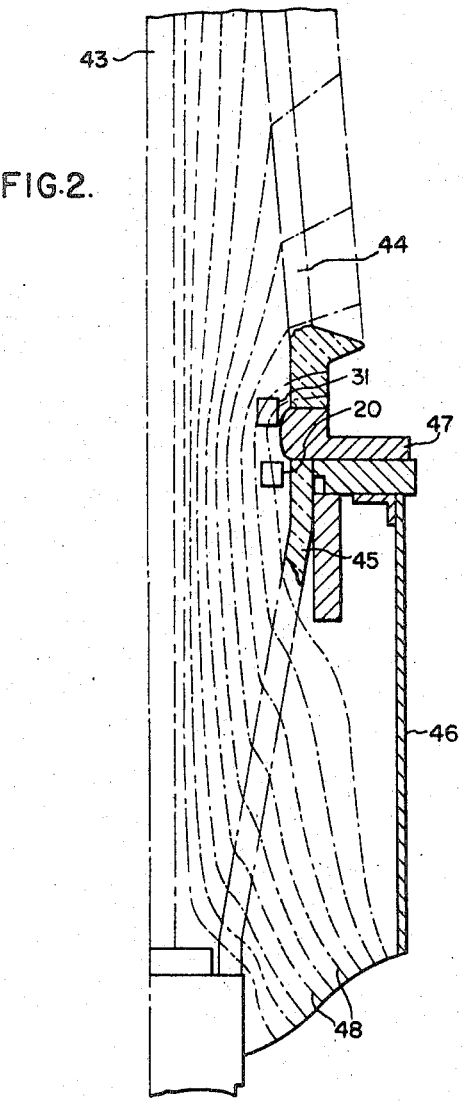
FIG. 2 is a diagram showing the actual measured electric field of a typical high voltage gas bushing.

Particular reference is made now to FIG. 2, where the measured electric field of a typical gas bushing employed in actual service is shown. A conductor stud 43 is enclosed between the aligned generally conically shaped porcelain wall portions 44 and 45 separated by a conductive or metallic mounting flange 47, mounted upon and electrically connected to a circuit breaker or transformer tank, a portion of the wall of the tank being shown at 46. Electrostatic equipotential lines are shown at 48. In the bushing of FIG. 2, electric field sensor device 31 is placed where the maximum number of lines pass through it; in accordance with convention, in FIG. 2 the areas where the lines are most closely spaced indicate areas of high electric field intensity. The sensitivity of magnetic field sensitive device 31 may be varied by shifting its position with respect to the ground flange 47.

For a fuller discussion of condenser bushings, reference may be had to an article entitled "The Design, Testing and Application of High Voltage Condenser Bushings," by E. J. Grimmer, a published paper No. CP 55–621 delivered at the A.I.E.E. Pacific General Meeting, Butte, Mont., August 1955.

It will be understood that, where the magnetic field is employed, the initial signal induced or generated in a sensor device other than a Hall generator may be proportional to the rate of change of current, and an integrator may be provided for obtaining a signal which varies with variations in the value of the current.

The term "bushing" when used herein and in the claims appended hereto includes but is not limited to any device suitable for line termination or line insulation through which a conductor or conductor stud may pass or into which a stud may extend, the bushing comprising a dielectric medium which may include either solid or fluid dielectric material substantially surrounding the stud over at least a portion of the length thereof, and if the bushing is mounted in a supporting conductive flange or other conductive member, electrically insulating and separating the stud from the flange. Condenser and gas bushings are specifically included within the definition.

Whereas we have shown and described our invention with respect to some embodiments thereof which give satisfactory results, it should be understood that changes may be made and equivalents substituted without departing from the spirit and scope of the invention.

We claim as our invention:

1. In current respnosive apparatus for a high voltage conductor and a bushing having a current carrying conductor stud therethrough, in combination, semiconductor sensor means located in the bushing at a position therein where magnetic lines of force caused by current in the conductor stud will pass through the sensor means, and means for generating an energizing signal for the sensor means, the means for generating the energizing signal being thermoelectric means disposed within the bushing and employing heat generated within the dielectric of the bushing, the semiconductor sensor means having a signal produced therein by the magnetic lines of force originating at the conductor stud.

2. Potential responsive apparatus for a high voltage conductor having a bushing connected between the conductor and an element of opposite polarity comprising, in combination, a molecular sensor device including a region for utilizing energy within the bushing to generate a direct current biasing voltage, said sensor device being sensitive to an electric field located in the bushing for obtaining a signal which is a function of the strength of the electric field and accordingly is a function of the potential difference between the conductor and the element of opposite polarity.

3. Potential responsive apparatus for use with a high voltage conductor comprising, in combination, a bushing connected between the conductor and an element of opposite polarity, a molecular sensor device located in the bushing in a predetermined orientation with respect to the electric field existing between the conductor and said element, the molecular sensor device including as a portion thereof means for generating a direct current biasing signal from energy in the bushing and as another portion thereof means for generating a signal which varies in amplitude in accordance with variations in the strength of the electric field, the molecular sensor device including as another portion thereof means for amplifying said signal.

4. Potential responsive apparatus for a high voltage conductor comprising, in combination, a bushing, molecular means positioned in the electric field of the bushing in predetermined orientation therein, the molecular means including a thermoelectric portion for generating a direct current voltage, the molecular means including a portion having material resistance-sensitive to variations in the electric field and having the direct current voltage applied thereto for generating a signal which varies in amplitude in accordance with variations in the strength of the electric field and accordingly with variations in the potential on the conductor.

5. Potential responsive apparatus for use with a high voltage bushing having a current carrying conductor therethrough comprising, in combination, a molecular sensor device adapted to be located in predetermined position in the bushing with respect to the conductor, the molecular sensor device including a first portion adapted to utilize energy derived from the magnetic field to produce a direct current, the molecular sensor device including a second portion having the direct current applied thereto as a biasing potential and generating a signal which varies in accordance with variations in the strength of the electric field and accordingly has an amplitude which is a function of the voltage in the conductor.

6. Apparatus according to claim 5 wherein the first portion utilizes a portion of the energy in the magnetic field to derive an alternating current voltage, said first portion being additionally characterized as including a rectifier domain for converting the alternating current voltage to a direct current biasing voltage.

7. Potential responsive apparatus for a high voltage current carrying conductor comprising, in combination, a condenser bushing, and molecular means positioned in the electric field of the condenser bushing in predetermined orientation therein, the molecular means including a thermoelectric portion for generating a direct current voltage, the molecular means including a portion having material resistance-sensitive to variations in the electric field and having the direct current voltage applied thereto for generating a signal which varies in amplitude in accordance with variations in the strength of the electrostatic field and accordingly with variations in the potential in the conductor.

References Cited

UNITED STATES PATENTS

| | | | |
|---|---|---|---|
| 2,187,541 | 1/1940 | Garanson et al. | 307—88.5 |
| 2,946,955 | 7/1960 | Kuhrt | 324—117 |
| 2,953,629 | 9/1960 | Lapp | 174—143 |
| 3,021,459 | 2/1962 | Grubbs et al. | 324—45 XR |
| 3,040,266 | 6/1962 | Forman | 307—88.5 |
| 3,146,518 | 9/1964 | Kishida | 174—143 XR |
| 3,255,208 | 12/1965 | Wolfe | 310—4 XR |
| 3,299,218 | 1/1966 | Sickles et al. | 307—88.5 |
| 3,273,066 | 9/1966 | Ruhnke. | |

RUDOLPH V. ROLINEC, Primary Examiner

ERNEST F. KARLSEN, Assistant Examiner

U.S. Cl. X.R.

174—143; 324—109, 127